(12) United States Patent
Hong et al.

(10) Patent No.: US 10,221,103 B2
(45) Date of Patent: *Mar. 5, 2019

(54) POROUS CERAMIC COMPOSITE PARTICLE AND METHOD FOR PREPARING THE SAME

(71) Applicant: Hyundai Motor Company, Seoul (KR)

(72) Inventors: Woong Pyo Hong, Gyeonggi-do (KR); In Woong Lyo, Gyeonggi (KR); Hong Kil Baek, Seoul (KR); Su Jung Noh, Seoul (KR); Seung Jeong Oh, Gyeonggi-do (KR); Seung Woo Lee, Seoul (KR); Bokyung Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 216 days.

This patent is subject to a terminal disclaimer.

(21) Appl. No.: 15/158,810

(22) Filed: May 19, 2016

(65) Prior Publication Data

US 2017/0166485 A1    Jun. 15, 2017

(30) Foreign Application Priority Data

Dec. 15, 2015  (KR) ........................ 10-2015-0179490

(51) Int. Cl.
*C04B 35/78*  (2006.01)
(52) U.S. Cl.
CPC ...... *C04B 35/78* (2013.01); *C04B 2235/3246* (2013.01); *C04B 2235/3418* (2013.01); *C04B 2235/5436* (2013.01)
(58) Field of Classification Search
CPC ............ C04B 35/78; C04B 2235/3246; C04B 2235/3418; C04B 2235/5436
USPC ....................................... 428/402
See application file for complete search history.

(56) References Cited

U.S. PATENT DOCUMENTS

| | | | | |
|---|---|---|---|---|
| 5,268,045 A | * | 12/1993 | Clare | ........................ C23C 4/02 |
| | | | | 148/518 |
| 6,051,279 A | * | 4/2000 | Gualco | ...................... C23C 4/04 |
| | | | | 427/447 |
| 2004/0156724 A1 | * | 8/2004 | Torigoe | ..................... C23C 4/18 |
| | | | | 416/241 R |
| 2006/0051599 A1 | * | 3/2006 | Jahedi | .................... B22D 41/00 |
| | | | | 428/469 |

FOREIGN PATENT DOCUMENTS

| | | |
|---|---|---|
| JP | 11-335804 | 12/1999 |
| JP | 2010-229471 A | 10/2010 |
| JP | 2013-209920 A | 10/2013 |
| JP | 2015-175285 A | 10/2015 |
| KR | 10-2007-0094166 A | 9/2007 |
| KR | 10-1119426 | 6/2010 |
| KR | 10-1558381 B1 | 10/2015 |

OTHER PUBLICATIONS

Hong, Sun-Wook et al., "The Synthesis of Silica Aerogel in the Macroporous Ceramic Structure by Sono-gel Process and Supercritical Drying Process", Jrl. of the Korean Ceramic Society, Vo. 47, No. 6, pp. 553-559 (2010).

* cited by examiner

*Primary Examiner* — Leszek B Kiliman
(74) *Attorney, Agent, or Firm* — Mintz Levin Cohn Ferris Glovsky and Popeo, P.C.; Peter F. Corless (57) ABSTRACT

Disclosed are a composite particle and a method of manufacturing the same. The composite particle may have an appropriate level of particle diameter and may maintain a stable shape and internal porous structure when the composite particle is applied during a coating process at high temperature.

18 Claims, 5 Drawing Sheets

POROUS CERAMIC COMPOSITE PARTICLE AND METHOD FOR PREPARING THE SAME

CROSS-REFERENCE TO RELATED APPLICATION

This application claims the benefit of priority to Korean Patent Application No. 10-2015-0179490 filed in the Korean Intellectual Property Office on Dec. 15, 2015, the entire contents of which are incorporated herein by reference.

TECHNICAL FIELD OF THE INVENTION

The present invention relates to a composite particle and a method. The composite particle may have a suitable diameter, and may maintain a stable shape and internal porous structure thereof as being applied in a coating process at high temperature and the like.

BACKGROUND OF THE INVENTION

An internal combustion engine refers to an engine in which combustion gas produced by combusting fuels directly apply to a piston or a turbine blade and the like to change thermal energy that fuels have to a mechanical work. This engine frequently means a reciprocating engine in which a mixed gas of fuels and air is ignited and exploded inside the cylinder to move a piston, but gas turbine, jet engine, rocket engine and the like are also included as the internal combustion engines.

According to the type of fuels, the internal combustion engine may be classified into gas engine, gasoline engine, petroleum engine, diesel engine, and the like. For instance, the petroleum engine, gas engine, and gasoline engine are ignited by electric spark from a spark plug, and the diesel engine injects a fuel into high-temperature and high-pressure air to ignite the fuel spontaneously. Depending on the stroke and movement of piston, the internal combustion engine may also be 4-stroke or 2-stroke cycle types.

Typically, the internal combustion engine of a vehicle has been known to have thermal efficiency of about 15% to 35%, but even at the maximum thermal efficiency of the internal combustion engine, about 60% or greater of the total thermal energy is consumed due to heat energy, exhaust gas or the like which are discharged to the outside through walls of the internal combustion engine.

Thus, when the amount of thermal energy discharged to the outside through the walls of the internal combustion engine is reduced, the efficiency of the internal combustion engine may be increased. Therefore, methods of installing a heat insulating material to the outside of the internal combustion engine or changing a part of the material or structure of the internal combustion engine or developing a cooling system of the internal combustion engine have been used.

In particular, when the discharge of heat generated in the internal combustion engine to the outside through the walls thereof is minimized, then it is possible to increase the efficiency of the internal combustion engine and the fuel efficiency of a vehicle. However, sufficient studies have not actively been made about a heat insulating material, a heat insulated structure or the like that can be maintained for a long period of time in the inside of the internal combustion engine where high-temperature and high-pressure is applied repeatedly.

Therefore, there exist needs for the development of new heat insulation materials that have superior low thermal conductivity characteristics and heat resistance, and can be maintained for a long period of time when applied to the internal combustion engine.

SUMMARY OF THE INVENTION

In preferred aspects, the present invention provides a composite particle that may comprise internal pores and made of a ceramic based material. The composite particle may be formed to maintain a suitable range of an average particle diameter, such that the composite particle may maintain a stable shape and internal pore structure as being applied in a coating process at high temperature and the like.

In one aspect, the present invention provides a porous ceramic composite particle. The composite particle may contain internal pores, and accordingly hereinafter, the composite particle also refers to a porous ceramic composite particle unless otherwise particularly indicated. The composite particle may comprise: an aerogel; and a ceramic compound. In certain preferred embodiments, the composite particle suitably may comprise a pore (internal pore) having a diameter of about 100 nm to 40,000 nm. Preferably, the ceramic composite particle may have an average diameter of about 50 μm to 500 μm.

The term "aerogel" as used herein refers to a solid or semi-solid material (e.g. gel) that contains pores. In particular, the pores in the aerogel may be filled with gas or air. Preferably, the pores in the aerogel may have various size distributions and size ranges, various shapes and various porosity or the like. The aerogel may not be particularly limited to specific materials, and preferably, the aerogel of the present invention may comprise silicon oxide, carbon or organic polymer as main components, i.e. greater than 50 weight % of the aerogel may suitably comprise silicon oxide, carbon and/or organic polymer.

The term "pore" as used herein refers to a vacancy, hole or cavity formed inside a material or matrix. Size or the shape of the pore may not be particularly limited. Preferably, the pores included in the porous ceramic composite may be defined with an average diameter without particular shape of the pores.

In the composite particle, a bond may be formed between the aerogel and the ceramic compound.

The aerogel may be an aerogel powder having a diameter of about 1 μm to 5 μm.

The ceramic compound may be a ceramic powder having a diameter of about 1 μm to 5 μm. Preferably, the ceramic compound may comprise one or more metal oxides selected from the group consisting of silicon (Si), aluminum (Al), titanium (Ti), zirconium (Zr), calcium (Ca), magnesium (Mg), yttrium (Y) and cerium (Ce).

The aerogel may comprise a nanopore having a diameter of about 1 nm to 500 nm.

The term "nanopores" as used herein refers to a vacancy, hole, pore or cavity that may have an average diameter in nanometer scale, for example, up to 999 nm, 900 nm, 800 nm, 700 nm, 2 0 600 nm, 500 nm, or particularly of about 1 nm to 500 nm.

Preferably, the composite particle may have a porosity of about 30% or greater.

Further provided is a vehicle part that may comprise the composite particle as described herein. For example, the vehicle part may be an internal combustion engine or on a component of the internal combustion engine that is coated with the composite particle on an inner surface thereof.

In another aspect, the present invention provides a method for preparing a porous ceramic composite particle. The method may comprise: spraying a mixture comprising an aerogel and a ceramic compound to a substrate rotating at a speed of about 1000 rpm to 20000 rpm; and heat treating a sprayed product at a temperature of about 500° C. to 1500° C.

The mixture may be sprayed on the substrate.

Preferably, a solid content in the mixture may be in an amount of about 40% to 60% by volume based on the total volume of the mixture. In addition, a content of the aerogel may be about 50 to 500 parts by weight based on 100 parts by weight of the ceramic compound included in the mixture.

Preferably, the ceramic compound may comprise at least oxide of one metal selected from the group consisting of silicon (Si), aluminum (Al), titanium (Ti), zirconium (Zr), calcium (Ca), magnesium (Mg), yttrium (Y) and cerium (Ce).

The aerogel may comprise a nanopore having a diameter of about 1 nm to 500 nm.

The heat treatment may be performed for about 1 hour to 10 hours.

The method may further comprise pulverizing the aerogel and the ceramic compound, before the step of spraying.

In addition, the method may further comprise drying the sprayed product at a temperature of about 100° C. to 300° C., before the step of heat treatment.

Other aspects of the present invention are disclosed infra.

According to the present invention, the porous ceramic composite particle may have a suitable range of the particle diameter (the average diameter) and may maintain a stable shape and an internal pore structure as being applied to high temperature coating process.

DETAILED DESCRIPTION OF THE INVENTION

The terminology used herein is for the purpose of describing particular exemplary embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The present invention provides a porous ceramic composite particle comprising aerogels and ceramic compounds. In particular, the porous ceramic composite particle may include pores having a diameter of about 100 nm to 40,000 nm and the ceramic composite particle may have an average diameter of about 50 μm to 500 μm.

In addition, the present invention provides a method for preparing a porous ceramic composite particle. The method may comprise steps of: spraying a mixture containing aerogels and ceramic compounds to a substrate rotating at a speed of 1000 rpm to 20000 rpm; and heat treating a sprayed product at a temperature of 500° C. to 1500° C. The mixture may be applied by any conventional coating method such as spraying, thermal spraying, plasma deposition, dipping, painting, immersing and the like. For example, the mixture may be sprayed to the substrate.

Hereinafter, various exemplary embodiments of the porous ceramic composite particle and the preparation method thereof according to the present invention will be described in more detail.

According to one embodiment of the present invention, provided is a porous ceramic composite particle that may comprise aerogels and ceramic compounds. In particular, the porous ceramic composite particle may contain pores having a diameter of about 100 nm to 40,000 nm, and the ceramic composite particle may have an average diameter of about 50 μm to 500 μm.

The present inventors have found through experiments that, when the above-described specific porous ceramic composite particle is used, strong bonds between aerogels and ceramic particles may be formed inside the composite particles and thus the components of the inside of the composite particles can maintain a stable shape and structure during a coating process at high temperature.

In particular, as the pores included in the porous ceramic composite particle and the nanopores included in the aerogel maintain their structures stably, high heat insulation effect may be obtained when the porous ceramic composite particle is applied in the heat insulator and the like. In addition, by reducing the density, the weight thereof may also be reduced.

Furthermore, the porous ceramic composite particle may suitably maintain the shape or the average particle diameter such that, during the coating process, the whole composite particles may not be melted and only a portion of the surface of the composite particle may be melted and the internal pore and aerogel structure including the nanopores may be maintained.

On the other hand, when a conventionally used simple mixed powder of aerogels and ceramic compounds is used, the bonds between aerogels and ceramic compounds may not be formed and thus composite particles may not obtain superior durability. Also, the average particle diameter of the powder is less than the predetermined size, for example, less than about 50 μm, and thus aerogels may be easily exposed during a subsequent coating process. Further, as the exposed aerogels are melted due to the high processing temperature of up to 10,000K, the pore structure of the aerogel may not be maintained, thereby increasing thermal conductivity and a volumetric heat capacity.

Therefore, it has been found that particles with high durability are formed through bonds between the aerogels and the ceramic compounds, and the average particle diameters of the particles are maintained at suitable size, the porous heat insulating coating layer with low thermal conductivity and a volumetric heat capacity may be prepared by preventing aerogels located at the inside of the particles from being melted during subsequent coating process and the like.

Accordingly, the porous ceramic composite particle according to exemplary embodiments of the invention may provide a heat insulation material or insulating structure that can be maintained for a long period of time in the inside of the internal combustion engine applied repeatedly to conditions of high temperature and high pressure. For example, the porous ceramic composite particle may be formed on the inner surface of the internal combustion engine or on the components of the internal combustion engine.

Examples of the method for forming the porous ceramic composite particle on the inner surface of the internal combustion engine or on the components of the internal combustion engine are not particularly limited, but for example, a method of forming a coating layer by dispersing the porous ceramic composite particle to a binder resin and the like.

The porous ceramic composite particle may include aerogels and ceramic compounds, and in particular, the porous ceramic composite particle may include pores having a diameter of about 100 nm to 40,000 nm.

The aerogels may have a structure made of entangled fine fibers with a thickness of about one-ten thousandth of hair and have a porosity of about 90% or greater. The aerogel may comprise silicon oxide, carbon, or organic polymer as main components. In particular, aerogels may be a very low density material with high light-transmitting property and substantially low thermal conductivity due to the above-described structural characteristics.

As the aerogels, previously known conventional aerogels may be used, for example, silicon oxide, carbon, polymer, metal oxide, or a mixture of two or more thereof may be used as the components for the aerogel. Examples of the polymer may include, but are not particularly limited to, polyvinyl alcohol, polyvinyl acetate, polyvinylpyrrolidone, polystyrene sulfonic acid sodium salt, polyethylene oxide, polyvinylidene fluoride, polyvinylidene fluoride-hexafluoropropylene, polytetrafluoroethylene, polystyrene or polyvinyl chloride, and the like.

The aerogel may contain nanopores having a diameter of about 1 nm to 500 nm, or of about 5 nm to 300 nm, or particularly of about 10 nm to 100 m. Thus, the aerogel may have a specific surface area of about 100 $cm^3/g$ to 1,000 $cm^3/g$, or particularly of about 300 $cm^3/g$ to 900 $cm^3/g$.

The aerogel may be aerogel powders with having diameter of about 1 μm to 5 μm. Examples of the method for preparing aerogel powders may include, but are not particularly limited to, a method of grinding a solid phase aerogel. As an example of the grinding method, a variety of known grinding methods such as ball mill may be used without limitation.

The ceramic compound may include at least one or more, or two or more metal oxides. Preferably, the metal oxide may include oxide, where one or more, or two or more metal elements selected from the group consisting of silicon (Si), aluminum (Al), titanium (Ti), zirconium (Zr), calcium (Ca), magnesium (Mg), yttrium (Y) and cerium (Ce), are combined with oxygen, respectively. For example, the metal oxide may include, for example, yttria-stabilized zirconia (YSZ) containing zirconium oxide and yttrium oxide.

The ceramic compound may be a ceramic powder having a diameter of 1 μm to 5 μm may be used. Examples of the method for preparing the ceramic powder may include, but are not limited particularly to, a method of grinding a solid phase ceramic compound. As an example of the grinding method, a variety of known grinding methods such as ball mill may be used without limitation.

The porous ceramic composite particle may include an amount of about 50 to 500 parts by weight, or of about 80 to 400 parts by weight, or particularly of about 100 to 300 parts by weight of aerogel, based on 100 parts by weight of the ceramic compound. When the content of the aerogel is less than the predetermined amount, for example, less than about 50 parts by weight, the thermal conductivity may not be reduced sufficiently for the suitable use of the porous heat insulation coating layer that may be finally prepared, thereby deteriorating sufficient heat insulation.

When the content of the aerogel is greater than the predetermined amount, for example, 500 parts by weight, the aerogel content in the inside of the finally prepared porous heat insulation coating layer may increase substantially, and a part of the surface of the aerogel may be exposed to the surface of the porous heat insulating coating layer, and irregularities may be generated on the surface of the porous heat insulation coating layer, thereby causing reduction of adhesion properties to the inner wall of the internal combustion engine.

A bond between the aerogel and the ceramic compound included in the porous ceramic composite particle may be formed. Due to the bond between the aerogel and the ceramic compound, the components of the inside of the composite particle maintain a stable shape and structure during the coating process at high temperature.

The bond may be a physical bond or adhesion between the aerogel and the ceramic compound. Examples of the method for forming the bond between the aerogel and the ceramic compound are not particularly limited, and for example, a sintering method of mixing the aerogel and the ceramic compound, heating the mixture to a temperature near the melting point so as to melt the mixture, and solidifying can be used.

The average diameter of the porous ceramic composite particle may be of about 50 μm to 500 μm, or particularly of about 50 μm to 200 μm. When the average diameter of the porous ceramic composite particle is less than about 50 μm, during the coating process at high temperature for the porous ceramic composite particle, the aerogel contained in the inside of the porous ceramic composite particle may be melted, and thus a porosity at the inside of the finally prepared coating layer may be reduced and thermal conductivity and a volumetric heat capacity may increase.

Further, when the average diameter of the porous ceramic composite particle is greater than about 500 μm, sufficient adhesion to a substrate may not be obtained in the coating process at high temperature for the porous ceramic composite particle.

Figure 1:
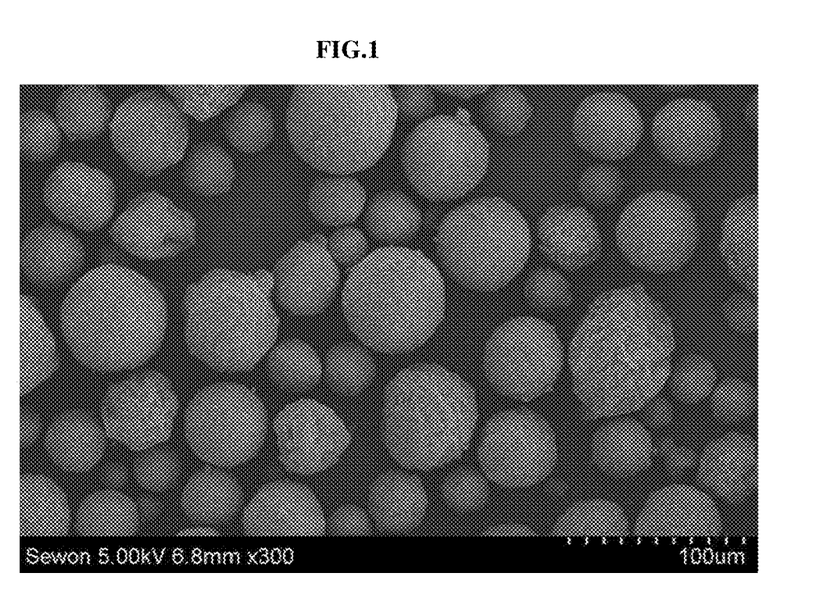
FIG. 1 shows a surface FE-SEM image of an exemplary porous ceramic composite particle prepared in Example 1 according to an exemplary embodiment of the present invention.

Examples of the specific shape of the porous ceramic composite particle are not particularly limited, but the ceramic composite particle may have the appearance of a spherical or approximately spherical shape as shown in FIG. 1.

The porosity of the porous ceramic composite particle may be of about 30% or greater, or of about 40% or greater, or of about 50% or greater, or particularly of about 65% or greater. The porosity of the porous ceramic composite particle means a ratio of all the pores contained in the porous ceramic composite particle (for example, the pores of the inside of aerogels and pores of the inside of the coating layer). For example, it may mean an area of pores based on the entire cross sectional area, with respect to one end surface of the porous ceramic composite particle.

Because the internal pore structure (nanopores) of the aerogels contained in the porous ceramic composite particle may be lost by melting or the like during the coating process, when the porosity of the porous ceramic composite particle is less than 30%, heat insulation properties from aerogels may be reduced thereby resulting in reducing the insulation properties of the finally prepared heat insulation coating layer.

Meanwhile, according to another embodiment of the invention, provided is a method for preparing a porous ceramic composite particle comprising the steps of: applying a mixture comprising aerogels and ceramic compounds to a substrate rotating at a speed of about 1000 rpm to 20000 rpm; performing a heat treatment to the substrate applied with the mixture at a temperature of 500° C. to 1500° C. The mixture may be applied to the substrate by generally know coating methods such as spraying, thermal spraying, plasma deposition, dipping, painting, immersing or the like.

The porous ceramic composite particle may be obtained by the method for preparing the porous ceramic composite particle according to various exemplary embodiments, and the description about the aerogels, ceramic compounds, and porous ceramic composite particles includes all of the description previously given in one embodiment of the invention.

The method for producing the porous ceramic composite particle may include a step of spraying a mixture containing aerogels and ceramic compounds onto a substrate rotating at a speed of about 1000 rpm to 20000 rpm.

The mixture may include aerogels and ceramic compounds. As described above, the aerogels may have a structure made of entangled fine fibers with a thickness of about one ten-thousandth of a hair and have a porosity of about 90% or greater. The aerogel may comprise silicon oxide, carbon or organic polymer as main components. In particular, the aerogel may be a very low density material with a high light-transmitting property and substantially low thermal conductivity due to the above-described structural characteristics.

As the aerogels, previously known conventional aerogels may be used, for example, silicon oxide, carbon, polymer, metal oxide, or a mixture of two or more thereof may be used as the components for the aerogel. Examples of the polymer may include, but are not particularly limited to, polyvinyl alcohol, polyvinyl acetate, polyvinylpyrrolidone, polystyrene sulfonic acid sodium salt, polyethylene oxide, polyvinylidene fluoride, polyvinylidene fluoride-hexafluoropropylene, polytetrafluoroethylene, polystyrene or polyvinyl chloride, and the like.

The aerogels may include nanopores having a diameter of about 1 nm to 500 nm, or of about 5 nm to 300 nm, or particularly of about 10 nm to 100 nm. Thus, the aerogels may have a specific surface area of about 100 $cm^3/g$ to 1,000 $cm^3/g$, or about 300 $cm^3/g$ to 900 $cm^3/g$.

The ceramic compound may include at least one or more, or two or more metal oxides. Preferably, the metal oxide may include an oxide where one or more, or two or more metal elements selected from the group consisting of silicon (Si), aluminum (Al), titanium (Ti), zirconium (Zr), calcium (Ca), magnesium (Mg), yttrium (Y) and cerium (Ce), are combined with oxygen, respectively. For example, yttria-stabilized zirconia (YSZ) containing zirconium oxide and yttrium oxide may be used as an example of the metal oxide.

The porous ceramic composite particle may include aerogels of about 50 to 500 parts by weight, or of about 80 to 400 parts by weight, or particularly of about 100 to 300 parts by weight, based on 100 parts by weight of the ceramic compound. When the content of the aerogel is less than the predetermined amount, for example, less than about 50 parts by weight, the thermal conductivity of the finally prepared porous heat insulation coating layer may not be reduced sufficiently, and thus sufficient heat insulation may not be obtained.

When the content of the aerogel is greater than the predetermined amount, for example, greater than about 500 parts by weight, the aerogel content of the inside of the finally prepared porous heat insulation coating layer may substantially increase, and a part of the surface of the aerogel may be exposed to the surface of the porous heat insulating coating layer and irregularities may be generated on the surface of the porous heat insulation coating layer, thereby causing reduction in adhesion properties to the inner wall of the internal combustion engine.

The mixture may additionally include additives such as a dispersing agent and a solvent. Examples of the dispersing agent used as the additive may include, but are not particularly limited to, polyvinyl alcohol, polyvinyl chloride, polyvinyl pyrrolidone, polyethylene glycol, gelatin, starch, sodium polyacrylate, carboxymethylcellulose, hydroxyethyl cellulose, sodium dodecyl sulfate, tetramethylene ammonium bromide, dioctyl sodium sulfosuccinate (Aerosol-OT), cetyltrimethylammonium bromide, or a mixture of two or more thereof.

In addition, the solvents are not particularly limited, and a variety of conventionally known organic solvents, inorganioc solvents, or aqueous solvents can be used without limitation.

The mixture may be produced by adding and mixing solid contents (for example, one or more selected from the group consisting of aerogels, ceramic compounds and additives) in the solvent. Examples of the mixing method are not particularly limited, and a variety of known mixing methods such as ball mill and the like can be used without limitation.

The amount of the solid content (solid component) included in the mixture may be of about 40% by volume to 60% by volume based on the total volume of the mixture. In other words, the mixture may be formed in a slurry in which the solid content may be contained in an amount of greater than a predetermined level. When the amount of the solid content contained in the mixture is less than about 40% by volume, the spherical shape and size of the porous ceramic composite particle may not be formed because bubbles can be gerenated in the solution during the mixing process of the mixture. When the amount of the solid content included in the mixture is greater than about 60% by volume, a fine droplet may not be formed in the spraying process because the viscosity of the mixture increases too much.

The mixture may be sprayed onto the substrate rotating at a speed of about 1000 rpm to 20000 rpm, or particularly of about 7000 rpm to 12000 rpm. Preferably, when the mixture is sprayed onto the substrate rotating at a speed of about 7000 rpm to 12000 rpm, the mixture may be blown by the centrifugal force of the substrate so that a droplet having a diameter in a defined level may be formed near the substrate.

When the rotation speed of the substrate is less than the predetermined speed, for example, less than about 1000 rpm, the diameter of the droplet produced may increase greater than about 200 μm, thereby the diameter of the finally prepared porous ceramic composite particle may also increase. As such, sufficient adhesion properties to a substrate may not be obtained in the coating process at high temperature for the porous ceramic composite particle.

When the rotation speed of the substrate is greater than the predetermined speed, for example, greater than about 20000rpm, the diameter of the droplet produced may decrease less than 10 μm, such that the diameter of the finally prepared porous ceramic composite particle may also decrease. Accordingly, during the coating process at high temperature for the porous ceramic composite particle, the aerogels contained in the inside of the porous ceramic composite particle may be melted, and thus a porosity at the inside of the finally prepared coating layer may decrease and the thermal conductivity and volumetric heat capacity may increase.

As the substrate, a variety of rotary plates that are commonly used in the method for forming a liquid droplet may be used and its specific shape and size are not limited. As an example of the method for forming the liquid droplet, the spray drying method may be used, and as a specific example thereof, a liquid mixture is supplied to the center of the disc which rotates at a high speed, then the liquid mixture is blown by the centrifugal force of the disc, and droplets can be formed in the vicinity of the disc. Using the above method, a powder may be formed without thermal deformation of the material because the process is performed at relatively low temperature, and the process can be performed rapidly, thus achieving economical efficiency.

The method for preparing the porous ceramic composite particle may further include a step of grinding a mixture of aerogel and ceramic compound prior to applying (spraying) the porous ceramic composite particle to the substrate. In this way, the aerogel and the ceramic compound may be mixed in a state of aerogel powder and ceramic powder, respectively.

The aerogel powder may have a diameter of about 1 μm to 5 μm. Examples of the method for preparing the aerogel powder may include, but are not particularly limited to, grinding solid phase aerogel, and as an example of the grinding method, a variety of known grinding methods such as ball mill can be used without limitation.

The ceramic powder may have a diameter of about 1 μm to 5 μm. Examples of the method for preparing the ceramic powder may include, but are not particularly limited to, a method of grinding a solid phase ceramic compound, and as an example of the grinding method, a variety of known grinding methods such as ball mill can be used without limitation.

The method for preparing the porous ceramic composite particle may further include a step of heat treating the sprayed product at a temperature at a temperature of about 500° C. to 1500° C., or particularly at a temperature of about 700° C. to 1100° C. Thus, only ceramic compound that is contained in the product obtained from the spraying step may melt and form bonds while being mixed with the aerogel. As a result, the durability of the finally prepared porous ceramic composite particle may be increased, and pores of the aerogel of the inside of the ceramic composite particle may be maintained.

When the heat treatment temperature is less than about 500° C., the ceramic compound may not melt sufficiently and a bonding strength between the aerogel and the ceramic compound may decrease, and when the heat treatment temperature is greater than about 1500° C., the porosity of the finally prepared porous ceramic composite particle may decrease because the aerogel melts too much.

The heat treatment step may be conducted for about 1 to 10 hours, or particularly for about 2 to 5 hours.

Prior to the heat treatment step, a drying step of drying the product obtained from the spraying step at a temperature of about 100° C. to 300° C., or particularly of about 150° C. to 200° C., may be further included. Through the drying step, the solvent that is contained in the product of the spraying step may be removed.

The method may further comprise a cooling step at a temperature of less than about 300° C. after the heat treatment step. Through the cooling step, the porous ceramic composite particle may be obtained in the form of a solid phase powder.

EXAMPLE

The present invention will be explained in detail with reference to the following Examples. However, these examples are only to illustrate the invention, and the scope of the invention is not limited thereto.

Example 1

Preparation of Ceramic Composite Particles and Thermal Insulation Coating Layer (1) Preparation of Ceramic Composite Particles 1000g of yttria-stabilized zirconia (YSZ) and 1000g of porous silica aerogel (specific surface area about 500cm$^3$/g) were mixed for 24 hours and ball milled to prepare a powder mixture. The powder mixture was mixed with solvent water together with a dispersant of polyvinyl alcohol (PVA). Wherein, the solid content of the mixture was about 50 volume%.

Thereafter, the mixture was sprayed to a disk rotating at a speed of about 10,000rpm using a nozzle, to form spherical droplets. The spherical droplets was dried by applying hot air of 180° C., and then, heat treated at a temperature of 900° C. for 4 hours to prepare ceramic composite particles with a diameter of the following Table 1.

(2) Preparation of a Thermal Insulation Coating Layer

For the ceramic composite particles, plasma thermal spray coating was conducted using arc plasma to prepare a thermal insulation coating layer. Specifically, argon and hydrogen were flowed as inert gas, and while moving a thermal spray gun, current of the following Table 1 was applied to the thermal spray gun to make the inert gas into plasma, and then, using the plasma, the ceramic composite particles were molten to a depth of about 5 μm from the surface for about 0.1 second, and sprayed at a thermal spraying distance of the following Table 1 for 10 minutes to prepare a thermal insulation coating layer having a thickness of 200 μm.

Comparative Examples 1 to 2

Preparation of Ceramic Composite Particles and Thermal Insulation Coating Layer

Comparative Example 1

Ceramic composite particles and a thermal insulation coating layer were prepared by the same method as Example 1, except that the porous silica aerogel was not used.

Comparative Example 2

For the powder mixture prepared by mixing 1000 g of yttria-stabilized zirconia (YSZ) and 1000 g of porous silica aerogel (specific surface area of about 500 cm3/g) for 24 hours and ball milling, plasma spray coating was conducted using arc plasma to prepare ceramic composite particles and a thermal insulation coating layer.

TABLE 1

Preparation conditions of the ceramic composite particles and thermal insulation coating layers of Examples and Comparative Examples

| | Average diameter(μm) | Thermal spraying power(A) | Thermal spraying distance(mm) |
|---|---|---|---|
| Example 1 | 100 | 470 | 75 |
| Comparative Example 1 | 100 | 470 | 75 |
| Comparative Example 2 | 20 | 470 | 75 |

As shown in the Table 1, it is confirmed that the ceramic composite particles of Example had an average diameter of 100 μm, while the ceramic composite particles of Comparative Example 2 had an average diameter of 20 μm, which is reduced particle diameter.

Experimental Example

Measurement of Properties of Ceramic Composite Particles and Thermal Insulation Coating Layers Obtained in Examples and Comparative Examples The properties of the ceramic composite particles and thermal insulation coating layers obtained in Example and Comparative Examples were measured as follows, and the results are shown in the Table 2 and Table 3.

1. FE-SEM Images

For the ceramic composite particles and thermal insulation coating layers obtained in Example 1 and Comparative Example 2, the internal structures were confirmed through the exterior or cross-sectional FE-SEM images, and the results are shown in the Table 2.

TABLE 2

Experimental results of Example and Comparative Examples

Figure 2:
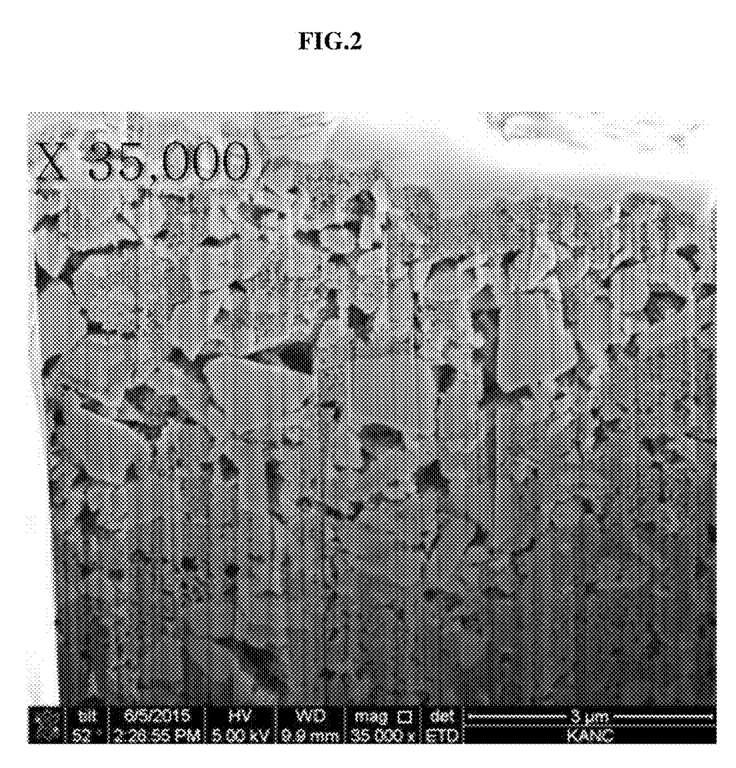
FIG. 2 shows a cross-sectional FE-SEM image of an exemplary porous ceramic composite particle prepared in Example 1 according to an exemplary embodiment of the present invention.
Figure 3:
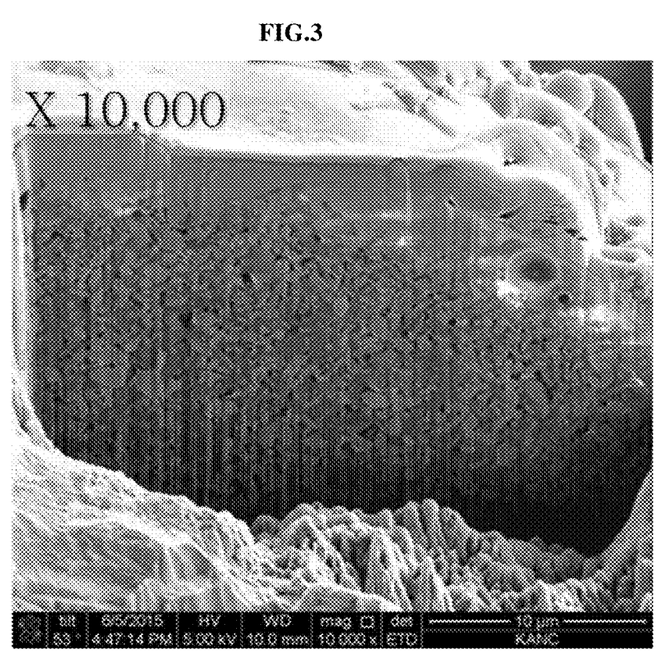
FIG. 3 shows a cross-sectional FE-SEM image of an exemplary porous heat insulating coating layer prepared in Example 1 according to an exemplary embodiment of the present invention.

| | | | FE-SEM images |
|---|---|---|---|
| Example 1 | Ceramic composite particles | Exterior | FIG. 1 |
| | | Cross section | FIG. 2 |
| | Porous thermal insulation coating layer | Cross section | FIG. 3 |

TABLE 2-continued

Experimental results of Example and Comparative Examples

Figure 4:
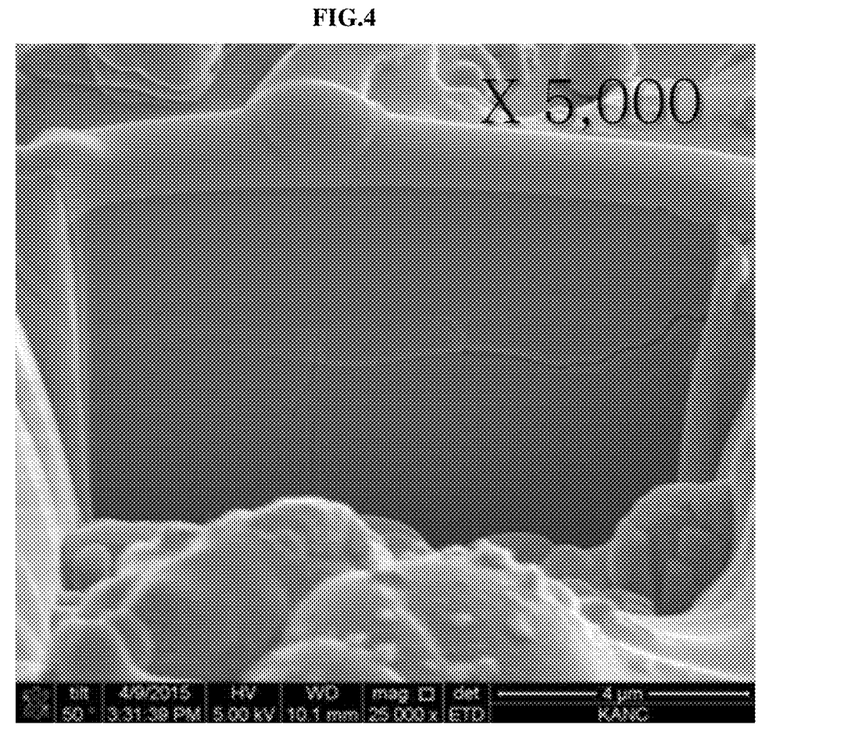
FIG. 4 shows a cross-sectional FE-SEM image of a heat insulating coating layer prepared in Comparative Example 2.
Figure 5:
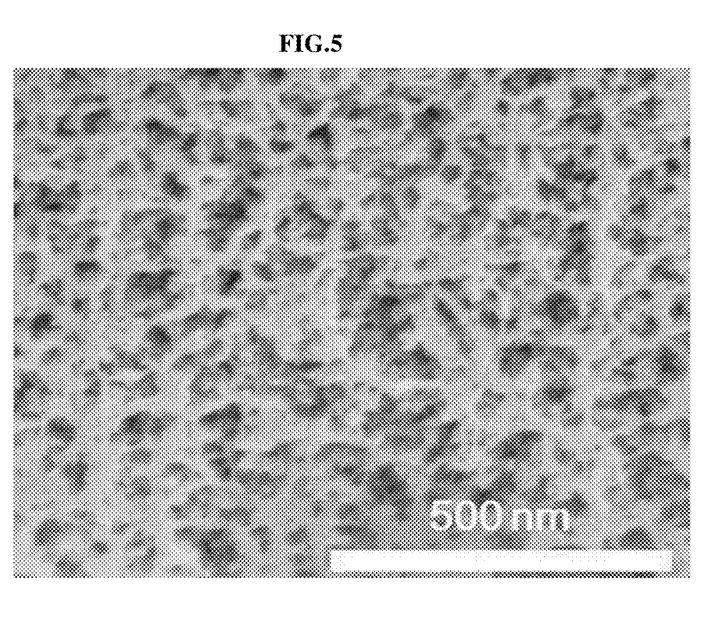
FIG. 5 shows a cross-sectional FE-SEM image of an exemplary aerogel used in Example 1 according to an exemplary embodiment of the present invention.

| | | | FE-SEM images |
|---|---|---|---|
| Comparative Example 2 | Porous thermal insulation coating layer | Cross section | FIG. 4 |

As shown in FIG. 1, it was confirmed that the ceramic composite particles of Example externally had a spherical shape, and had an average diameter of 100 μm.

And, as shown in FIG. 2, it was confirmed that inside of the ceramic composite particles, yttria-stabilized zirconia (YSZ) and porous silica aerogel were uniformly mixed, and at the mixing interface, and the like, pores were additionally included to afford porosity.

In the case of the thermal insulation coating layer as shown in FIG. 3, it was confirmed that the internal structure of the ceramic composite particles was included as it is, thus exhibiting porosity, and at the external surface, a film was formed by melting of the ceramic compound or porous silica aerogel.

Meanwhile, in the case of the thermal insulation coating layer of Comparative Example 2 as shown in FIG. 4, it was confirmed that yttria-stabilized zirconia (YSZ) and porous silica aerogel were all molten, and thus, no pores existed inside the coating layer.

2. Thermal Conductivity(W/mK)

For the thermal insulation coating layers obtained in Example and Comparative Examples, thermal conductivity was measured by thermal diffusion measurement technique using laser flash method according to ASTM E1461 under room temperature and atmospheric pressure conditions, and the results are shown in the following Table 3.

3. Volume Heat Capacity(KJ/m3K)

For the thermal insulation coating layers obtained in Example and Comparative Examples, specific heat was measured with sapphire as a reference using a DSC apparatus under room temperature condition according to ASTM E1269, thus measuring heat capacity, and the results are shown in the following Table 3.

4. Porosity(%)

For the vertical sections of the thermal insulation coating layers obtained in Example and Comparative Examples, porosity was measured using Image J program of an image analyzer, and the results are shown in the following Table 3.

5. Density(g/ml)

For the thermal insulation coating layers obtained in Example and Comparative Examples, density was measured according to ISO 18754, and the results are shown in the following Table 3.

TABLE 3

The Experiment results of Example and Comparative Examples

| | Thermal conductivity(W/mK) | Volume heat capacity(KJ/m$^3$K) | Porosity(%) | Density(g/ml) |
|---|---|---|---|---|
| Example 1 | 1.0 | 600 | 80 | 0.7 |
| Comparative Example 1 | 2.2 | 2000 | 3 | 5.5 |
| Comparative Example 2 | 1.0 | 1900 | 8 | 2.4 |

As shown in the Table 3, the thermal insulation coating layer of Example secured porosity of 65% or greater, thus satisfying low volume heat capacity of 1500 KJ/m3K or less and low thermal conductivity of 2.0 or less, and the density was also low as 0.7 g/ml.

On the contrary, as Comparative Example 1 did not contain aerogel inside the ceramic composite particles, porosity rapidly decreased to 3%, and thus, volume heat capacity, thermal conductivity, and density significantly increased.

And, in the case of Comparative Example 2 which contained powder obtained by simply mixing a ceramic compound and aerogel, aerogel was molten in the process of thermal spray coating, and thus, porosity decreased to 8%, and volume heat capacity and density increased.

Thus, it was confirmed that by using porous ceramic composite particles as in Example, the pore structure of aerogel may be maintained inside the porous coating layer prepared by a thermal spray coating process, thus achieving the effect of decreasing thermal conductivity and heat capacity.

What is claimed is:

1. A porous ceramic composite particle comprising:
    an aerogel; and
    a ceramic compound,
    wherein the composite particle comprises a pore having a diameter of about 100 nm to 40,000 nm,
    wherein the ceramic composite particle has an average diameter of about 50 μm to 500 μm.

2. The porous ceramic composite particle according to claim 1,
    wherein a bond is formed between the aerogel and the ceramic compound.

3. The porous ceramic composite particle according to claim 1,
    wherein the aerogel is an aerogel powder having a diameter of about 1 μm to 5 μm.

4. The porous ceramic composite particle according to claim 1,
    wherein the ceramic compound is a ceramic powder having a diameter of about 1 μm to 5 μm.

5. The porous ceramic composite particle according to claim 1,
    wherein the ceramic compound comprises one or more metal oxides selected from the group consisting of silicon (Si), aluminum (Al), titanium (Ti), zirconium (Zr), calcium (Ca), magnesium (Mg), yttrium (Y) and cerium (Ce).

6. The porous ceramic composite particle according to claim 1,
    wherein the aerogel comprises a nanopore having a diameter of about 1 nm to 500 nm.

7. The porous ceramic composite particle according to claim 1,
    wherein the composite particle has a porosity of about 30% or greater.

8. A vehicle part that comprises a porous ceramic composite particle according to claim 1.

9. The vehicle part according to claim 8, wherein the vehicle part is an internal combustion engine or on a component of the internal combustion engine that is coated with the composite particle on an inner surface thereof.

10. A method for preparing a porous ceramic composite particle comprising:
    spraying a mixture comprising an aerogel and a ceramic compound to a substrate rotating at a speed of about 1000 rpm to 20000 rpm; and
    heat treating a sprayed product at a temperature of about 500° C. to 1 500° C.

11. The method according to claim 10, wherein the mixture is sprayed on the substrate.

12. The method according to claim 10,
    wherein a solid content in the mixture is in an amount of about 40% to 60% by volume based on the total volume of the mixture.

13. The method according to claim 10,
    wherein a content of the aerogel is about 50 to 500 parts by weight based on 100 parts by weight of the ceramic compound included in the mixture.

14. The method according to claim 10,
    wherein the ceramic compound comprises at least oxide of one metal selected from the group consisting of silicon (Si), aluminum (Al), titanium (Ti), zirconium (Zr), calcium (Ca), magnesium (Mg), yttrium (Y) and cerium (Ce).

15. The method according to claim 10,
    wherein the aerogel comprises a nanopore having a diameter of about 1 nm to 500 nm.

16. The method according to claim 10,
    wherein the heat treatment is performed for about 1 hour to 10 hours.

17. The method according to claim 10,
    further comprising a step of pulverizing the aerogel and the ceramic compound, before the step of spraying.

18. The method according to claim 10,
    further comprising a step of drying the sprayed product at a temperature of about 100° C. to 300° C., before the step of heat treatment.

* * * * *